US009772626B2

(12) United States Patent
Bendewald et al.

(10) Patent No.: US 9,772,626 B2
(45) Date of Patent: Sep. 26, 2017

(54) METHOD FOR A DRIVER ASSISTANCE SYSTEM OF A VEHICLE

(71) Applicant: VOLKSWAGEN AG, Wolfsburg (DE)

(72) Inventors: Lennart Bendewald, Wolfsburg (DE); Linn Hackenberg, Wolfsburg (DE); Daniel Lüddecke, Magdeburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/026,714

(22) PCT Filed: Sep. 30, 2014

(86) PCT No.: PCT/EP2014/070922
§ 371 (c)(1),
(2) Date: Apr. 1, 2016

(87) PCT Pub. No.: WO2015/049231
PCT Pub. Date: Apr. 9, 2015

(65) Prior Publication Data
US 2016/0231743 A1 Aug. 11, 2016

(30) Foreign Application Priority Data
Oct. 1, 2013 (DE) .................. 10 2013 110 852

(51) Int. Cl.
*G05D 1/00* (2006.01)
*G01C 21/36* (2006.01)
(Continued)

(52) U.S. Cl.
CPC ........... *G05D 1/0061* (2013.01); *B60K 35/00* (2013.01); *B60W 30/12* (2013.01); *B60W 30/16* (2013.01);
(Continued)

(58) Field of Classification Search
CPC ............. G05D 1/0061; G05D 1/021; G05D 2201/0213; B60K 35/00; B60W 30/12;
(Continued)

(56) References Cited

U.S. PATENT DOCUMENTS

| 5,774,069 | A | 6/1998 | Tanaka et al. | |
| 8,346,426 | B1* | 1/2013 | Szybalski | B60W 50/14 701/25 |
| 9,063,543 | B2* | 6/2015 | An | G05D 1/0055 |
| 2013/0002416 | A1 | 1/2013 | Gazit | |
| 2013/0179023 | A1* | 7/2013 | Schmidt | G05D 1/021 701/23 |

FOREIGN PATENT DOCUMENTS

| DE | 19743024 A1 | 4/1999 |
| DE | 10355462 A1 | 6/2005 |

(Continued)

OTHER PUBLICATIONS

Search Report for International Patent Application No. PCT/EP2014/070922; dated Jan. 5, 2015.

*Primary Examiner* — Todd Melton
(74) *Attorney, Agent, or Firm* — Barnes & Thornburg LLP

(57) ABSTRACT

A driver assistance system for a vehicle. The driver assistance system controls the vehicle at least partially automatically. In the method, the start of an auto pilot route section is determined in the course of a route planned for the vehicle. The driver assistance system is able to control the vehicle automatically along the autopilot route section. A distance between the current position of the vehicle and the start of the autopilot route section is determined and output in the vehicle.

22 Claims, 5 Drawing Sheets

(51) Int. Cl.
    *G05D 1/02*    (2006.01)
    *B60W 50/00*   (2006.01)
    *B60W 50/14*   (2012.01)
    *B60K 35/00*   (2006.01)
    *B60W 30/12*   (2006.01)
    *B60W 30/16*   (2012.01)

(52) U.S. Cl.
    CPC ........ *B60W 50/0097* (2013.01); *B60W 50/14* (2013.01); *G01C 21/3694* (2013.01); *G05D 1/021* (2013.01); *B60W 2050/146* (2013.01); *B60W 2550/402* (2013.01); *G05D 2201/0213* (2013.01); *Y02T 10/84* (2013.01)

(58) Field of Classification Search
    CPC .. B60W 30/16; B60W 50/0097; B60W 50/14; B60W 2050/146; B60W 2550/402
    See application file for complete search history.

(56) References Cited

FOREIGN PATENT DOCUMENTS

| | | |
|---|---|---|
| DE | 102006053499 A1 | 8/2008 |
| DE | 102007039375 A1 | 3/2009 |
| DE | 102010001579 A1 | 8/2011 |
| DE | 102011101541 A1 | 11/2012 |
| DE | 102011082398 A1 | 3/2013 |
| DE | 102012002581 A1 | 8/2013 |

\* cited by examiner

METHOD FOR A DRIVER ASSISTANCE SYSTEM OF A VEHICLE

PRIORITY CLAIM

This patent application is a U.S. National Phase of International Patent Application No. PCT/EP2014/070922, filed 30 Sep. 2014, which claims priority to German Patent Application No. 10 2013 110 852.0, filed 1 Oct. 2013, the disclosures of which are incorporated herein by reference in their entirety.

FIELD

Illustrative embodiments relate to a method for a driver assistance system of a vehicle, in particular, for a driver assistance system which is capable of controlling the vehicle at least partially automatically. Such functions of a driver assistance system are also designated as autopilot function. Illustrative embodiments relate, in particular, to an information output, which relates to the autopilot function or its notification. Disclosed embodiments also relate to a driver assistance system, which is suitable for carrying out the method.

SUMMARY

Modern or future vehicles, such as, for example, automobiles or trucks, are increasingly being fitted with driver assistance systems, which enable partial or fully automatic driving of the vehicle. Under certain conditions, these systems can take over both the transverse guidance and also the longitudinal guidance of the vehicle independently. A driver of the vehicle need not permanently monitor this automatic guidance of the vehicle, which is also designated as autopilot function, but can transfer the guidance of the vehicle to the autopilot function or take this back at a suitable time.

Fully automatic vehicle guidance by an autopilot function is at the present time a new experience and unusual functionality for most vehicle users so that a clear separation between manual driving by the driver of the vehicle and automatic vehicle guidance by the autopilot function is desirable. Furthermore, the fact that the driver is provided with detailed and suitable information of the system activity of the autopilot function can contribute to the acceptance of an autopilot function.

Disclosed embodiments provide a method for a driver assistance system of a vehicle and a driver assistance system for a vehicle.

BRIEF DESCRIPTION OF THE FIGURES

Disclosed embodiments are described in detail below with reference to the appended drawings.

DETAILED DESCRIPTION OF THE DISCLOSED EMBODIMENTS

Figure 1:
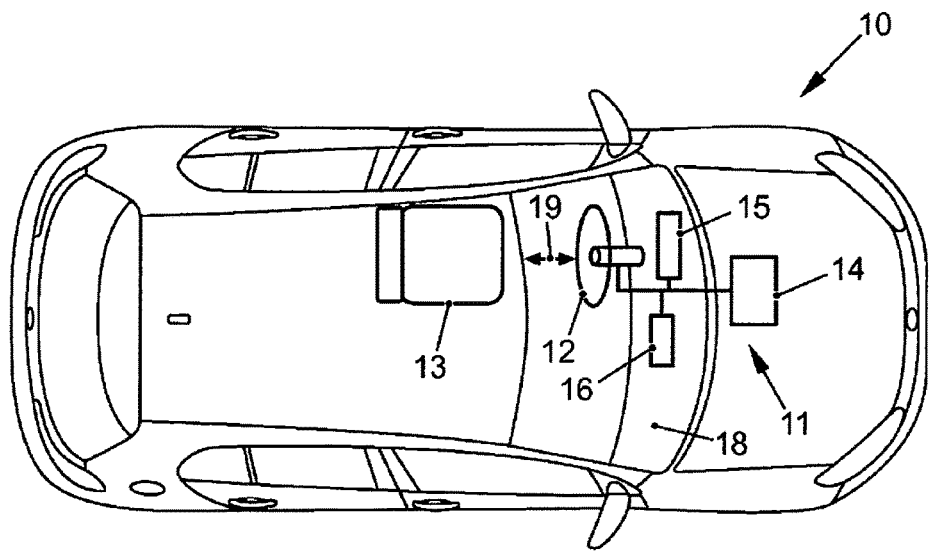
FIG. 1 shows schematically a vehicle according to at least one disclosed embodiment.

The term autopilot function or autopilot for short is used in connection with the disclosed embodiments. The autopilot function relates to a function of a driver assistance system, which is capable of automatically controlling the vehicle at least in certain situations or on certain roads such as, for example, freeways or highways. That is, the autopilot function takes over the longitudinal guidance and/or transverse guidance of the vehicle and controls the vehicle without intervention or assistance by the driver. The control of the vehicle with the aid of the autopilot function is also designated as highly automated driving or autonomous driving.

Disclosed embodiments provide a method for a driver assistance system in a vehicle. The driver assistance system is capable of controlling the vehicle at least partially automatically. For example, the driver assistance system can control the vehicle fully automatically on some route sections along a planned route, e.g., on freeway sections or highway sections. The automatic control can, for example, comprise an automatic longitudinal guidance and an automatic transverse guidance of the vehicle. In the method, a start of an autopilot route section is determined in the course of a route planned for the vehicle. The planned course of the route can be predefined, for example, by a navigation system of the vehicle. In the autopilot route section the driver assistance system is capable of controlling the vehicle automatically. In the method a distance between a current position of the vehicle and the start of the autopilot route section is furthermore determined. This distance is output to a driver in the vehicle. By outputting the distance from the start of the autopilot route section, it is shown to a driver of the vehicle in a simple manner when the autopilot function will be available. As a result, the driver can estimate when he can transfer the guidance function to the vehicle and can turn his attention to another activity, for example, a telephone call or studying documents such as, for example, emails.

According to at least one disclosed embodiment, the distance is output on a display device in the vehicle. In this case, the distance can be output in text form, for example. The text form can, for example, give a distance in kilometers from the start of the autopilot route section. Alternatively or additionally, a prospective travel time to the start of the autopilot route section can be determined. This prospective travel time can be determined, for example, from the distance and a typical traffic situation to the start of the autopilot route section. The prospective travel time to the start of the autopilot route section thus defined can, for example, be output in text form on the display device. The text form can, for example, comprise a time in minutes or in minutes and seconds. Alternatively or additionally, a symbol can be output on the display device, which depicts symbolically the prospective travel time or the distance. For example, the symbol can comprise a bar, which becomes shorter with decreasing distance or decreasing prospective travel time. Alternatively or additionally, the symbol can be a ring, in which a ring segment size is changed depending on the distance or the prospective travel time. Alternatively or additionally, a graphical view of the course of the planned route can be displayed. In the graphical view of the course of the planned route, the distance to the start of the autopilot route section can be marked graphically, for example, by marking a route to the start of the autopilot route section with a predefined color. In the graphical view, the course of the route can also be shown in an abstract manner, e.g., as a straight section. Alternatively or additionally, acoustic outputs are also possible, for example, the distance can be counted down as voice information via an audio system of the vehicle, for example, a countdown. The previously described outputs thus provide the vehicle driver with detailed, helpful information which is nevertheless simple and rapid to understand on the availability of the autopilot in a suitable manner.

In a further disclosed embodiment, a length of the autopilot route section is determined and the length of the autopilot route section is output. Using the output of the prospective length of the autopilot route section, the driver can estimate how long he can dedicate to another task during the autopilot route section. For example, the driver can accordingly select a task which he can prospectively completely accomplish during the next autopilot route section. Similarly to when outputting the distance from the start of the autopilot route section, the length of the autopilot route section can also be output in text form as kilometer information, in text form as a prospective autopilot travel time, as a symbol or as a graphical view of the course of the planned route with the autopilot route section marked therein.

In a further disclosed embodiment, the driver assistance system has an autopilot function, which can be activated for automatic control of the vehicle along the autopilot route section by a driver. Depending on an activation state of the autopilot function, the length of the autopilot route section is output on a first display device in the vehicle or on a second display device in the vehicle. For example, when the autopilot function is not activated, the length of the autopilot route section can be displayed on the first display device, for example, a display device in a combi instrument in an area behind a steering wheel of the vehicle, and when the autopilot function is activated, on the second display device, for example, on an additional display device, which is disposed in a central region of the dashboard of the vehicle. As long as the driver has not activated the autopilot function and is therefore controlling the vehicle himself, it is displayed in the first display device in the combi instrument whether and for how long the autopilot function is available. The driver can decide with the aid of this information whether he would like to transfer the vehicle guidance to the autopilot function or continue to control the vehicle himself. If the driver transfers the vehicle guidance to the autopilot function, the length of the autopilot route section is shown on the second display device. As a result, a clear separation of the vehicle guidance by the driver or the autopilot function is given visually. Furthermore, further occupants of the vehicle can easily identify by means of the display of the length of the autopilot route section on the second display device that the vehicle is controlled by the autopilot function and the driver is therefore allowed to turn his attention to another occupation.

In a further disclosed embodiment, a future driving maneuver, which is planned by the driver assistance system during the automatic control of the vehicle, is displayed on a display device in the vehicle. The future driving maneuver can, for example, comprise a lane change, turning, braking, or acceleration of the vehicle. In particular, when the vehicle is controlled automatically by the autopilot function, by displaying the future driving maneuver on the display device, in particular on the second display device, the acceptance of the use of the autopilot function by a driver of the vehicle or by the occupants of the vehicle can be increased. By showing the future driving maneuver on the separate second display device, in particular a front-seat passenger and other occupants of the vehicle can intuitively and simply identify that the vehicle is controlled by the autopilot function.

In addition, a traffic situation around the vehicle as is detected by the driver assistance system for the automatic control of the vehicle can be determined and shown on a display device of the vehicle, in particular on the second display device, for example, combined with the future driving maneuvers. By showing the surroundings information, the confidence which a driver and the passengers of the vehicle should have in the autopilot function can be increased since the driver assistance system clearly shows which surroundings information is detected and therefore taken into account. Furthermore, through a glance at the display device, a driver can obtain an overview of the current traffic situation, which can be beneficial when transferring driving responsibility back to the driver.

According to at least one disclosed embodiment, the future driving maneuver or the traffic situation around the vehicle is output depending on the activation state of the autopilot function as desired on the first display device or on the second display device. For example, future driving maneuvers and the traffic situation around the vehicle can be displayed on the first display device in the combi instrument of the vehicle when the autopilot function is switched off and on the second display device in the central region of the dashboard when the autopilot is switched on. As a result, a driver can assess when the autopilot function is switched off whether the autopilot function adequately detects the traffic situation, whereby the confidence in the autopilot function can be increased. When the autopilot function is activated, drivers and other occupants of the vehicle can follow and assess the operating mode of the autopilot function, whereby again confidence in the autopilot function can be formed or a driver can optionally intervene rapidly in the vehicle guidance.

In a further disclosed embodiment, it is determined whether the vehicle is located on the autopilot route section. If the vehicle is located on the autopilot route section and the autopilot function is not activated, an instruction is output as to how the autopilot function can be activated or is to be activated. The instruction can, for example, be an electronically faded-in instruction panel in a display in the combi instrument of the vehicle. The instruction can, for example, comprise a pictorial display, which shows control elements of the vehicle, which are to be actuated to activate the autopilot function. Alternatively or additionally, an acoustic instruction can be output. To avoid an inadvertent activation and deactivation of the autopilot function, operations with a certain complexity are usually required to activate or to deactivate the autopilot function. For example, it can be necessary to simultaneously actuate several actuating elements on a steering wheel of the vehicle and/or to move the steering wheel into a certain position, for example, in the direction of the dashboard or in the direction of the driver. To make it easier for an untrained driver to use the autopilot function, corresponding instructions can be output, whereby the acceptance of the autopilot function can be increased.

In a further disclosed embodiment, an end of the autopilot route section in the course of the route planned for the vehicle is determined. Furthermore, a distance between the current position of the vehicle and the end of the autopilot route section is determined. If the vehicle is operated with activated autopilot function along the autopilot route section, an instruction to deactivate the autopilot function is output depending on the distance between the current position of the vehicle and the end of the autopilot route section. For example, the instruction can be output several hundred meters before the end of the autopilot route section or a certain time of, for example, 30 seconds before the end of the autopilot route section. The instruction can comprise more accurate operating instructions, which instruct the driver how to deactivate the autopilot function. In addition, the instruction can, for example, comprise a counter, for example, a countdown, which gives the remaining distance between the current position of the vehicle and the end of the autopilot route section. As a result, a driver of the vehicle can be requested to take over driving responsibility in good time.

Disclosed embodiments provide a driver assistance system for a vehicle. The driver assistance system is capable of controlling the vehicle at least partially automatically. The driver assistance system comprises an output device and a processing device. The processing device is capable of determining a start of an autopilot route section in the course of a route planned for the vehicle. The driver assistance system can automatically control the vehicle in the autopilot route section. The processing device is further configured to determine a distance between a current position of the vehicle and the start of the autopilot route section, and to output the distance on the output device. The driver assistance system is therefore suitable for carrying out the previously described method and its embodiments and therefore also comprises the previously described benefits.

Disclosed embodiments also provide a vehicle, which comprises the previously described driver assistance system and therefore is capable of being controlled at least partially automatically.

FIG. 1 shows a vehicle 10 with a driver assistance system 11. The vehicle 10 further comprises a steering wheel 12 and a driver's seat 13. The driver assistance system 11 comprises a control device 14, a first display device 15, and a second display device 16. The processing device 14 is coupled to the first and second display device 15, 16 and the steering wheel 12. The first display device 15 is disposed, for example, in a combi instrument, which is located behind the steering wheel 12 from the view of a driver sitting on the driver's seat 13. The second display device 16 is disposed, for example, approximately centrally in the vehicle transverse direction in a dashboard 18 of the vehicle 10. The driver assistance system 11 is capable of controlling the vehicle 10 at least partially automatically, for example, whereby the driver assistance system 14 controls both a transverse guidance and also a longitudinal guidance of the vehicle 10 along several route sections of a driving route. As a result, the driver assistance system 11 is capable of controlling the vehicle 10 without activity of a driver, at least in certain situations. The functionality of the driver assistance system 11 for automatic control of the vehicle 10 is subsequently designated as autopilot function. The autopilot function can, for example, be activated or deactivated by actuating corresponding control elements on the steering wheel 12. Further, the autopilot function can be activated by the driver pushing the steering wheel 12 manually away from himself in the direction of the dashboard 18 and the autopilot function can be deactivated by the driver manually pulling the steering wheel 12 away from the dashboard 18 again toward himself. This movement of the steering wheel 12 is illustrated by the arrow 19 in FIGS. 1 and 2.

Figure 2:
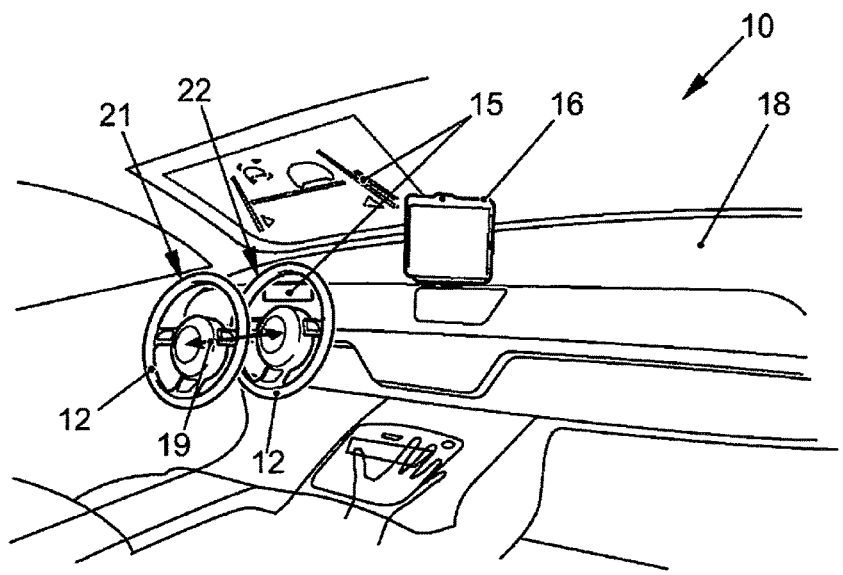
FIG. 2 shows schematically an interior view of the vehicle of FIG. 1.

FIG. 2 shows schematically a perspective view of an interior of the vehicle 10. The steering wheel 12 can be moved, as described previously, by moving the steering wheel 12 in the direction of the arrow 19 as desired into a first position 21 or a second position 22 to deactivate or to activate the autopilot function of the driver assistance system 11. In addition, the first display device 15 and the second display device 16 are shown in FIG. 2. The first display device 15 can, as described previously, be implemented, for example, as a display in a so-called freely programmable combi display. Furthermore, the first display device 15 can also comprise a display faded into a wind shield of the vehicle, a so-called headup display.

The operating mode of the driver assistance system 11 in conjunction with the display devices 15, 16 is described in detail hereinafter in conjunction with FIGS. 3-8.

Figure 3:
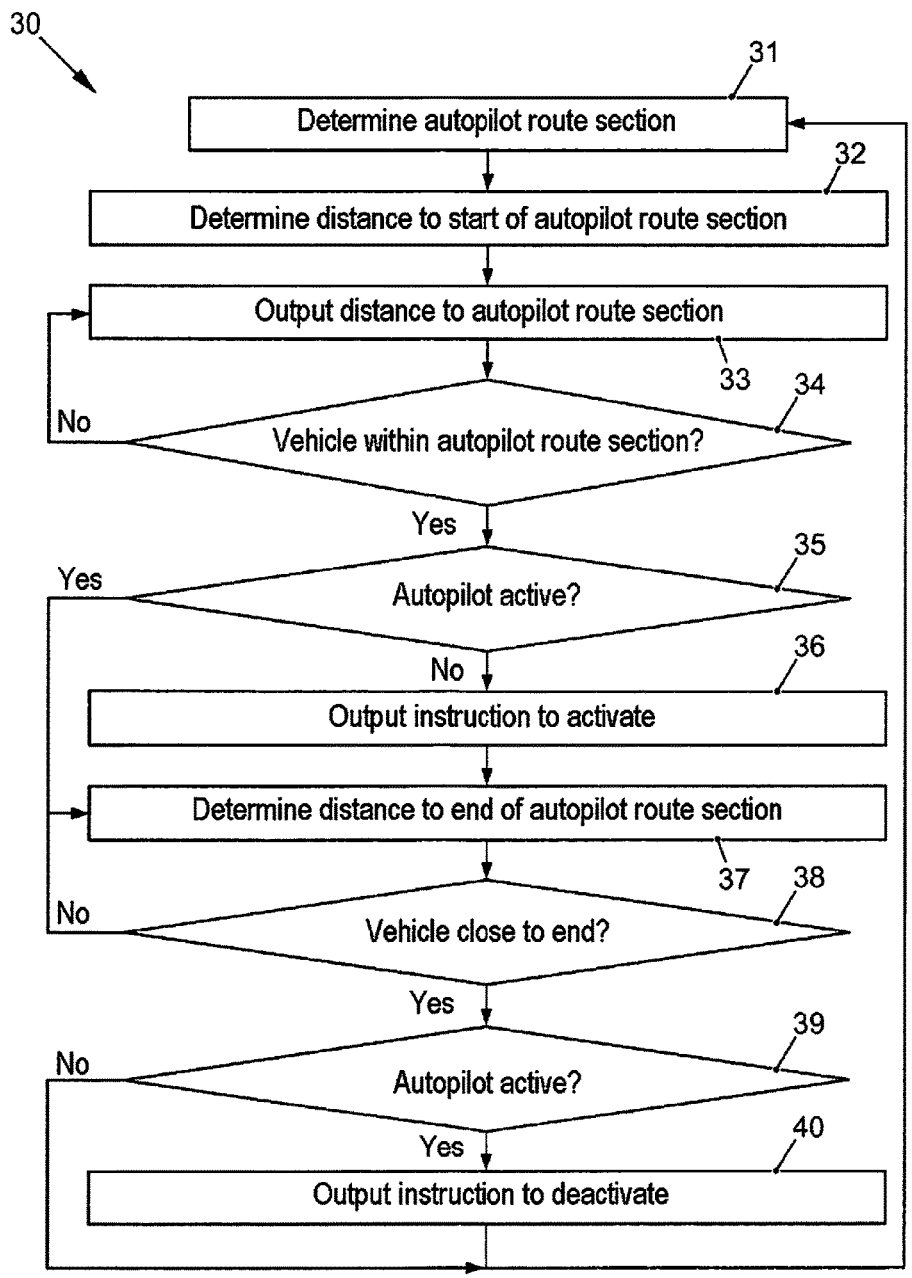
FIG. 3 shows method operations of a method according to at least one disclosed embodiment.
Figure 4:
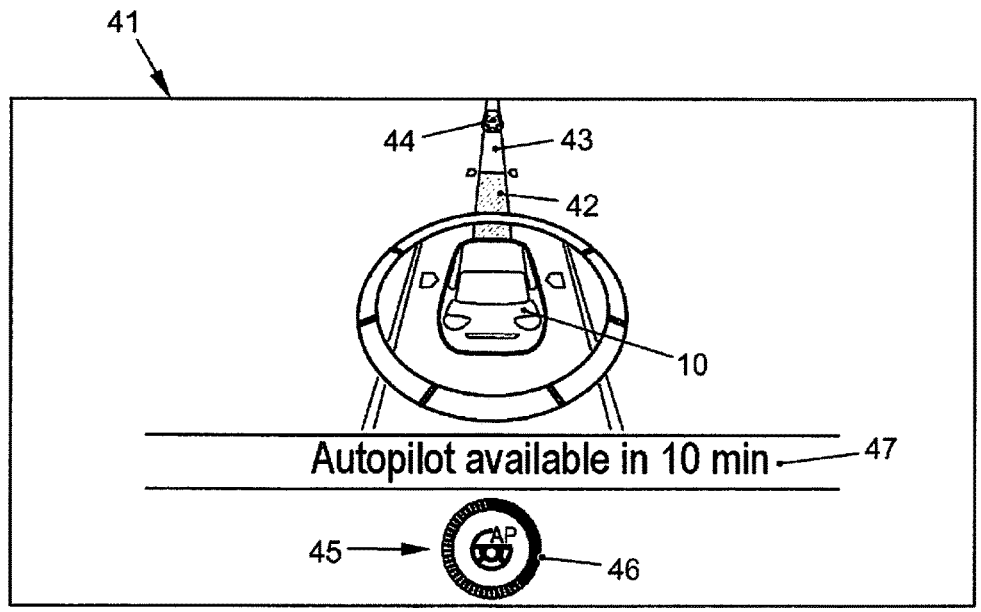
FIG. 4 shows an output on a display in a combi instrument according to at least one disclosed embodiment.

FIG. 3 shows method operations 31-40 of a method 30 which is executed by the processing device 14. The method starts from a manual driving operation, i.e., the vehicle 10 is guided manually by a driver of the vehicle 10. A navigation system of the vehicle 10 has, for example, determined a route to a destination or a prospective route of the vehicle 10 in an arbitrary different manner. Normal information for the driver, for example, a speed of the vehicle, a tank filling level, a current engine speed etc., is displayed on the first display device 15 in the combi instrument or in the headup display. During this manual travel, information for a future autopilot travel is already additionally displayed. To this end, in operation 31 an autopilot route section is determined along which the driver assistance system 11 is prospectively capable of automatically controlling the vehicle 10. In operation 32, starting from a current position of the vehicle 10 a distance from the start of this autopilot route section is determined. This distance from the start of the autopilot route section is output in operation 33 on the first display device 15. FIG. 4 shows such an output 41 of operation 33.

In FIG. 4 the distance to the autopilot route section is shown in various ways in the output 41. On the one hand, the vehicle 10 is shown schematically in the direction of travel and a future course of a route to a preceding vehicle 44 is shown, which is divided into a first fraction 42 up to the start of the autopilot route section and a second fraction 43, which forms the autopilot route section.

During travel of the vehicle 10, the first fraction 42 therefore becomes increasingly shorter until the start of the autopilot route section 43 is reached. In addition, on the output 41 a text output 47 is provided in which the time before reaching the start of the autopilot route section 43 is displayed taking into account, for example, usual traffic conditions. In the example shown in FIG. 4, the autopilot function is available in 10 minutes. Finally a ring symbol 45 is shown on the output 41, which comprises a colored or marked ring segment 46, which is enlarged depending on the approach to the start of the autopilot route section 43 until the autopilot route section is reached and the ring segment 46 occupies the entire ring.

The abstracted course of the route 42, 43 thus indicates schematically from which route position the autopilot function can be activated. Both the textual representation 47 and the symbolic representation 45 illustrate how much longer the vehicle must be driven manually. In this case, the predicted availability representation can be based on route-based data to avoid an overly frequent adaptation in the course of travel. The first section 42 can have a different color to the second section 43. As soon as the autopilot function is available, the entire route ahead of the vehicle 10 is thus in the color of the second section 43, which indicates an availability of the autopilot function. Parallel to this, for example, the symbol 45 can have a corresponding color.

In operation 34 of the method 30 of FIG. 3 it is checked whether the vehicle is located at the start of the autopilot route section or even already within the autopilot route section. As long as this is not the case, in operation 33 the distance to the start of the autopilot route section is output in updated form on the display device 14. As soon as the vehicle has reached the autopilot route section, the method is continued in operation 35. There it is checked whether the driver activates the autopilot function by a corresponding actuation of, for example, corresponding control elements on the steering wheel 12 or by a shift of the steering wheel 12 or not. If the autopilot function is not activated, an instruction to activate the autopilot function is output in operation 36. Such an output is shown in FIG. 5.

Figure 5:
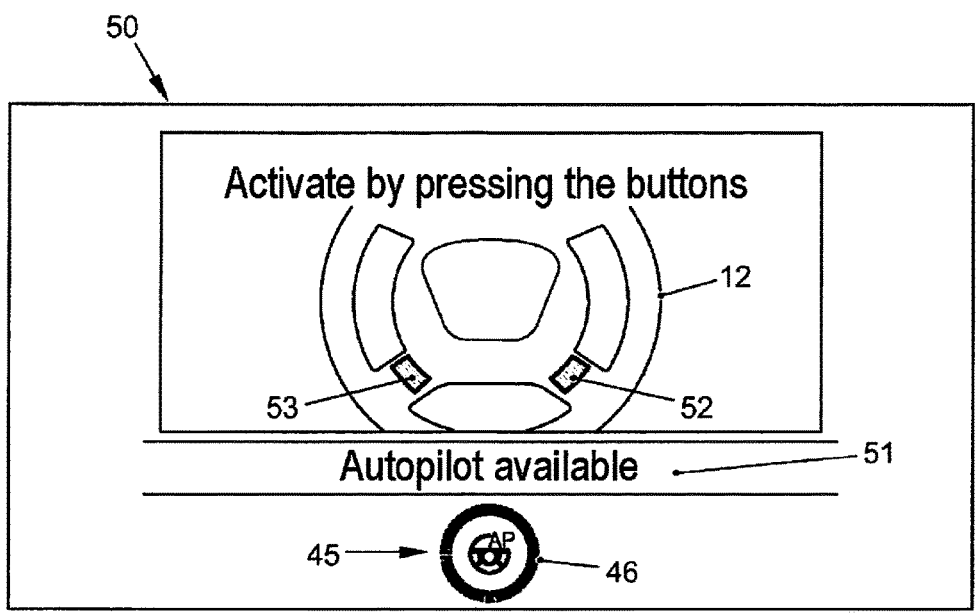
FIG. 5 shows a further output on the display in the combi instrument according to at least one disclosed embodiment.

The output 50 of FIG. 5 indicates on the one hand with the aid of the writing 51 that the autopilot function is available. It is furthermore indicated with the aid of the symbol 45 that the autopilot function is available. Finally the steering wheel 12 is shown with control elements 52 and 53 and an indication that the autopilot can be activated by pressing the control elements 52, 53.

If the driver should attempt to activate the autopilot function before the vehicle is located within the autopilot route section, this can be illustrated on the output device 14 with a corresponding notification that the autopilot function is not yet available.

Figure 7:
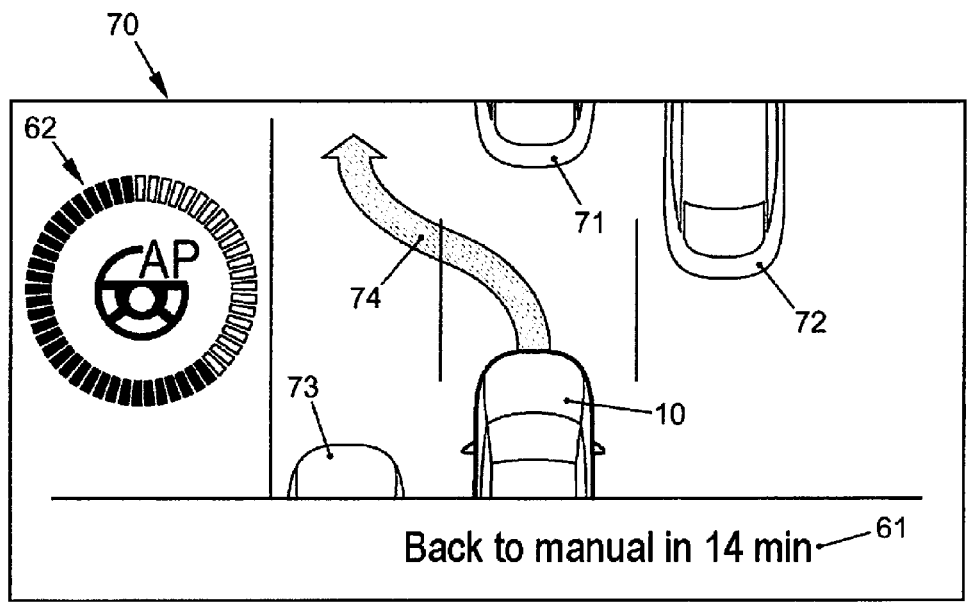
FIG. 7 shows a further output on the display in the dashboard according to at least one disclosed embodiment.

When the driver has activated the autopilot function, this can be confirmed by a corresponding output on the first display device 15, for example, by a color change of the symbol 45. In addition, an output 70 with detailed information about the autopilot function is provided on the second display device 16. For example, as shown in FIG. 7, a future driving maneuver 74 of the vehicle 10, for example, a lane change, can be shown. In addition to the planned transverse guidance shown in FIG. 7, the future driving maneuvers also relate to planned severe changes in longitudinal guidance such as, for example, accelerating and braking. To complete the surroundings information, other road users 71-73, for example, vehicles, pedestrians and cyclists, can also be shown on the second display device 16 in an abstracted manner. To indicate their relevance for one's own travel, these objects can also be shown with their estimated motion trajectory, for example, by indicating a direction in which a vehicle or a pedestrian moves. One's own vehicle 10 is shown emphasized, for example, in a color which is also used to represent the autopilot symbol 45 of FIG. 5, to illustrate the activity of the autopilot function.

Figure 6:
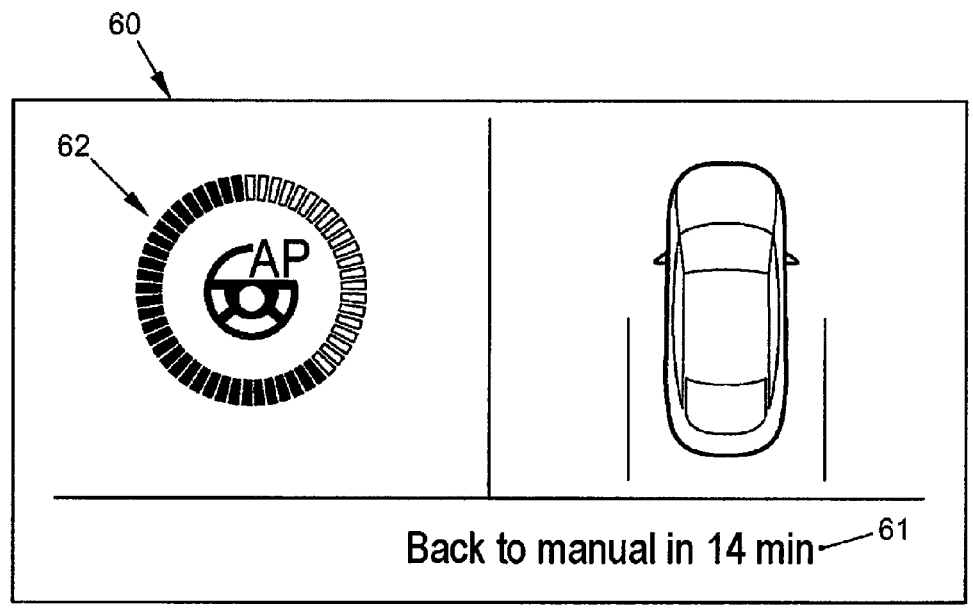
FIG. 6 shows an output on a display in a dashboard of the vehicle according to at least one disclosed embodiment.

Whilst the autopilot function is active, in operation 37 of FIG. 3 a distance from the end of the autopilot route section is determined. This distance can be provided in outputs 60, 70, as shown in FIGS. 6 and 7, as text output 61 or as a graphical symbol 62. The driver will therefore always be informed about the duration of piloted travel. As a result, the driver can estimate which activities he can perform during piloted travel, for example, telephoning or reading or composing electronic messages.

Figure 8:
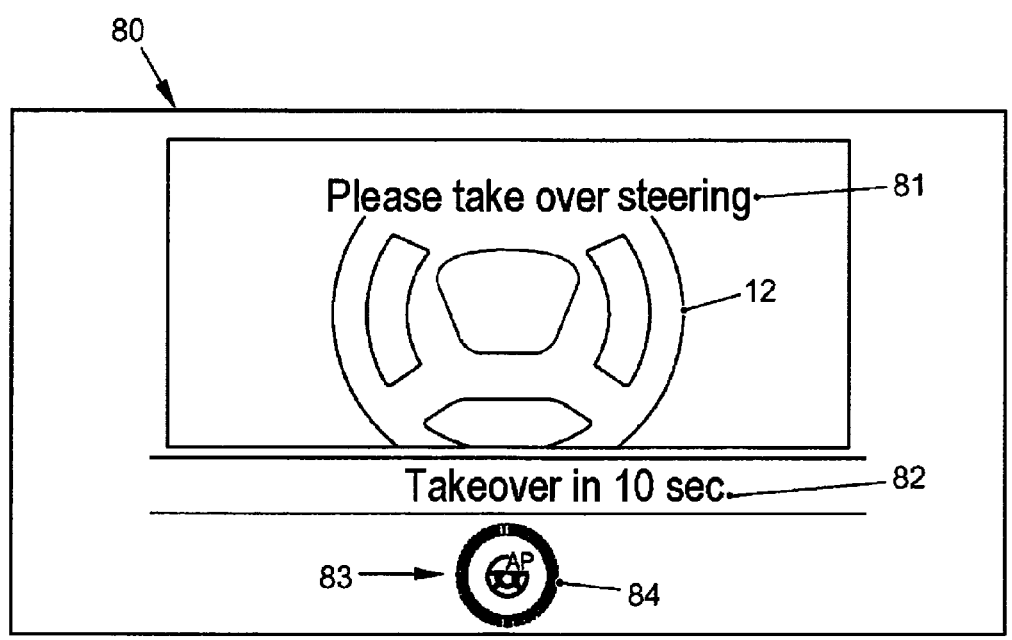
FIG. 8 shows another output on the display in the combi instrument according to at least one disclosed embodiment.

In operation 38 it is checked whether the vehicle is approaching the end of the autopilot route section. If the end of the autopilot route section will be reached in, for example, less than 10-30 seconds or is only a few hundred meters away, it is checked in operation 39 whether the autopilot function is still active. If the autopilot function is still active, an instruction to deactivate is output in operation 40. A corresponding output 80 is shown in FIG. 8. The instruction to deactivate can comprise both a textual output 82 and also a symbolic output 83. In the textual output 82 the time until a necessary takeover is counted down, for example, in seconds. In the symbolic representation 83, a ring segment 84 is changed depending on the remaining time or distance to the end of the autopilot route section. In addition, a steering wheel 12 can be displayed together with a request 81 (please take over steering). Additional acoustic outputs are also possible. The output 80 can, for example, be output on the first display device 15 and, for example, when a predefined time for takeover is fallen below, additionally be output on the second display device 16 to illustrate the urgency of the vehicle takeover to the driver.

Further instructions in textual or graphical form can be output on the second display device 16 when the autopilot function is active. If the driver, for example, during a journey with activated autopilot function, releases his seatbelt, a corresponding warning can be output that the driver should fasten his seatbelt again since otherwise the autopilot function will be deactivated after a predefined time and the vehicle then either should be controlled manually by the driver or will be brought automatically to a stop. Furthermore, if the driver shows a non-interpretable action, e.g., performs light steering movements on the steering wheel 12, an instruction can be output as to how the autopilot function can be switched off if this is desired by the driver.

The previously described method offers a great level of transparency in regard to the availability of the autopilot function. Both the future availability and also the duration of the availability of the autopilot function are predicted by route data. For the driver, this means that he can thereby estimate how long and which auxiliary activities he can devote his attention to during the next active phase of the autopilot function. By showing the surroundings information, appropriate confidence can be instilled in the driver and the passengers and the driver can be provided with the current situation in the surroundings of the vehicle in the case when driving responsibility is returned to the driver. The additional instructions and explanations in both textual and also symbolic form for activation and deactivation of the autopilot function facilitate the handling of this new technology.

The second display device 16 can, for example, comprise a touch-sensitive surface and be configured as a so-called touchscreen. The touch-sensitive surface can be used to configure the displayed information individually for the user. As a result, a desired information density on the second display device 16 can be set. For example, the detailed surroundings information shown in FIG. 7 can only be switched on as required. The arrangement of the first display device 15 and the second display device 16, as shown previously in FIGS. 1 and 2, is only exemplary. For example, a common large display device can be used, wherein a certain part is reserved for showing the autopilot functionality. With separate display devices, the second display device 16 can, for example, be automatically mechanically adjustable and can be countersunk in the dashboard 18. The availability of the autopilot function can in this case be symbolized by a mechanical retraction of the second display device 16. The less time remains in the autopilot route section, the further the second display device 16 retracts into the dashboard 18.

Modern or future vehicles, such as, for example, automobiles or trucks, are increasingly being fitted with driver assistance systems, which enable partial or fully automatic driving of the vehicle. Under certain conditions, these systems can take over both the transverse guidance and also the longitudinal guidance of the vehicle independently. A driver of the vehicle need not permanently monitor this automatic guidance of the vehicle, which is also designated as autopilot function, but can transfer the guidance of the vehicle to the autopilot function or take this back at a suitable time.

In this connection, a motor vehicle with autonomous vehicle guidance and electronic communication means is disclosed in DE 197 43 024 A1. A control device is provided in the vehicle, by which means the communication means can be activated for performing a communication process and the vehicle guidance means can be activated for autonomous vehicle guidance. Upon identifying that manual vehicle guidance is becoming necessary, the activated vehicle guidance means transmit a takeover information item to the communication means, which display this takeover information item on a display device.

DE 10 2007 039 375 B4 relates to a motor vehicle with a driver assistance system having a stop and go function. The driver assistance system provides a longitudinal guidance of the vehicle and comprises a detection apparatus for detecting information which relates to a preceding vehicle. Depending on the information detected by the detection apparatus, the driver assistance system can automatically brake the motor vehicle to a standstill and, upon detecting a renewed starting of the preceding vehicle, automatically start the motor vehicle again depending on an actuating signal which can be given by a driver via an input device.

REFERENCE SIGN LIST

10 Vehicle
11 Driver assistance system
12 Steering wheel
13 Driver's seat
14 Processing device
15 First display device
16 Second display device
18 Dashboard
19 Arrow
21 First position
22 Second position
30 Method
31-40 Operation
41 Output
42 Route section
43 Autopilot route section
44 Preceding vehicle
45 Symbol
46 Ring segment
47 Textual output
50 Output
51 Textual output
52, 53 Control element
60 Output
61 Textual output
62 Symbol
70 Output
71-73 Vehicle
74 Driving maneuver
80 Output
81 Instruction
82 Textual output
83 Symbol
84 Ring segment

The invention claimed is:

1. A method for a driver assistance system of a vehicle, wherein the driver assistance system is capable of controlling the vehicle at least partially automatically, the method comprising:
   determining a start of an autopilot route section in the course of a route planned for the vehicle, wherein the route comprises the autopilot route section and a manual driving route section, and wherein the driver assistance system automatically controls the vehicle in the autopilot route section;
   determining a distance between a current position of the vehicle and the start of the autopilot route section; and
   outputting the distance in the vehicle.

2. The method of claim 1, wherein the outputting of the distance comprises:
   outputting the distance in text form; and/or
   determining a prospective travel time to the start of the autopilot route section depending on the distance and outputting the prospective travel time to the start of the autopilot route section in text form; and/or
   outputting a symbol, wherein an extension of the symbol is set depending on the distance or the prospective travel time; and/or
   outputting a graphical view of the course of the planned route, wherein the distance is marked in the graphical view.

3. The method of claim 1, further comprising:
   determining a length of the autopilot route section; and
   outputting the length of the autopilot route section.

4. The method of claim 3, wherein the outputting of the length of the autopilot route section comprises:
   outputting the length in text form; and/or
   determining a prospective autopilot travel time depending on the length of the autopilot route section and outputting the prospective autopilot travel time in text form; and/or
   outputting a symbol, wherein an extension of the symbol is set depending on the length of the autopilot route section or the prospective autopilot travel time; and/or
   outputting a graphical view of the course of the planned route, wherein the autopilot route section is marked in the graphical view.

5. The method of claim 3, wherein the driver assistance system has an autopilot function, which can be activated for automatic control of the vehicle along the autopilot route section, wherein the length of the autopilot route section is output depending on an activation state of the autopilot function on a first display device in the vehicle or on a second display device in the vehicle.

6. The method of 5, wherein the first display device is disposed in a combi instrument in an area behind a steering wheel of the vehicle and in that the second display device is disposed in a central region of a dashboard of the vehicle in the vehicle transverse direction.

7. The method of claim 1, further comprising:
   showing a future driving maneuver, which has been planned by the driver assistance system for the automatic control of the vehicle, on a display device of the vehicle.

8. The method of claim 7, wherein the future driving maneuver is output depending on the activation state of the autopilot function on a first display device or on a second display device.

9. The method of claim 1, further comprising:
   determining a traffic situation around the vehicle as detected by the driver assistance system for the automatic control of the vehicle; and showing the traffic situation on a display device of the vehicle.

10. The method of claim 9, wherein the traffic situation around the vehicle is output depending on the activation state of the autopilot function on the first display device or on the second display device.

11. The method of claim 1, wherein the driver assistance system has an autopilot function, which can be activated for the automatic control of the vehicle along the autopilot route section by a driver of the vehicle, the method further comprising:
determining whether the vehicle is located on the autopilot route section; and
if the vehicle is located on the autopilot route section and the autopilot function is not activated, outputting an instruction as to how the autopilot function can be activated.

12. The method of claim 1, wherein the driver assistance system has an autopilot function, which can be activated for the automatic control of the vehicle along the autopilot route section and wherein the autopilot function can be deactivated by a driver of the vehicle, the method further comprising:
determining an end of the autopilot route section in the course of the route planned for the vehicle;
determining a distance between the current position of the vehicle and the end of the autopilot route section; and
outputting an instruction to deactivate the autopilot function depending on the distance between the current position of the vehicle and the end of the autopilot route section.

13. A driver assistance system for a vehicle, wherein the driver assistance system is capable of controlling the vehicle at least partially automatically, the driver assistance system comprising:
an output device; and
a processing device, wherein the processing device is configured to determine a start of an autopilot route section in the course of a route planned for the vehicle, wherein the route comprises the autopilot route section and a manual driving route section, and wherein the driver assistance system is capable of controlling the vehicle in the autopilot route section automatically, determining a distance between a current position of the vehicle and the start of the autopilot route section, and outputting the distance on the output device.

14. The driver assistance system of claim 13, wherein the outputting of the distance comprises:
outputting the distance in text form; and/or
determining a prospective travel time to the start of the autopilot route section depending on the distance and outputting the prospective travel time to the start of the autopilot route section in text form; and/or
outputting a symbol, wherein an extension of the symbol is set depending on the distance or the prospective travel time; and/or
outputting a graphical view of the course of the planned route, wherein the distance is marked in the graphical view.

15. The driver assistance system of claim 13, wherein a length of the autopilot route section is determined and output in text form and/or a prospective autopilot travel time is determined and output in text form.

16. The driver assistance system of claim 15, wherein an extension of an output symbol is set depending on the length of the autopilot route section or the prospective autopilot travel time.

17. The driver assistance system of claim 13, wherein the driver assistance system has an autopilot function, which can be activated for automatic control of the vehicle along the autopilot route section, wherein the length of the autopilot route section is output depending on an activation state of the autopilot function on a first display device in the vehicle or on a second display device in the vehicle.

18. The driver assistance system of 17, wherein the first display device is disposed in a combi instrument in an area behind a steering wheel of the vehicle and in that the second display device is disposed in a central region of a dashboard of the vehicle in the vehicle transverse direction.

19. The driver assistance system of claim 13, wherein a future driving maneuver, which has been planned by the driver assistance system for the automatic control of the vehicle, is displayed on a display device of the vehicle or a traffic situation around the vehicle detected by the driver assistance system for the automatic control of the vehicle is displayed on the display device.

20. The driver assistance system of claim 19, wherein the future driving maneuver or the traffic situation is output depending on the activation state of the autopilot function on a first display device or on a second display device.

21. The driver assistance system of claim 13, wherein the driver assistance system has an autopilot function, which can be activated for the automatic control of the vehicle along the autopilot route section by a driver of the vehicle, the driver assistance system determining whether the vehicle is located on the autopilot route section, and, if the vehicle is located on the autopilot route section and the autopilot function is not activated, outputting an instruction as to how the autopilot function can be activated.

22. The driver assistance system of claim 13, wherein the driver assistance system has an autopilot function, which can be activated for the automatic control of the vehicle along the autopilot route section and wherein the autopilot function can be deactivated by a driver of the vehicle, wherein the driver assistance system determines an end of the autopilot route section in the course of the route planned for the vehicle, determines a distance between the current position of the vehicle and the end of the autopilot route section, and outputs an instruction to deactivate the autopilot function depending on the distance between the current position of the vehicle and the end of the autopilot route section.

* * * * *